United States Patent
Gomes et al.

(10) Patent No.: US 11,644,793 B2
(45) Date of Patent: May 9, 2023

(54) DIFFUSER ASSEMBLY

(71) Applicant: Dualitas Ltd., Milton Keynes (GB)

(72) Inventors: Ricardo Gomes, Milton Keynes (GB);
Pedro Moreira, Milton Keynes (GB);
Alexander Cole, Milton Keynes (GB)

(73) Assignee: Dualitas Ltd., Milton Keynes (GB)

( * ) Notice: Subject to any disclaimer, the term of this patent is extended or adjusted under 35 U.S.C. 154(b) by 0 days.

(21) Appl. No.: 16/843,544

(22) Filed: Apr. 8, 2020

(65) Prior Publication Data

US 2020/0326464 A1 Oct. 15, 2020

(30) Foreign Application Priority Data

Apr. 11, 2019 (GB) ..................... 1905158

(51) Int. Cl.
*G03H 1/32* (2006.01)
*G02B 5/02* (2006.01)
*G02B 7/00* (2021.01)

(52) U.S. Cl.
CPC .............. *G03H 1/32* (2013.01); *G02B 5/02* (2013.01); *G02B 7/00* (2013.01); *G02B 5/0263* (2013.01); *G03H 2223/14* (2013.01)

(58) Field of Classification Search
None
See application file for complete search history.

(56) References Cited

U.S. PATENT DOCUMENTS

| 4,256,363 | A | 3/1981 | Briones |
| 9,270,957 | B2 | 2/2016 | Yoshida |
| 10,036,895 | B2* | 7/2018 | Avivi ................... G02B 27/646 |
| 2006/0227293 | A1 | 10/2006 | Kasazumi |
| 2006/0244918 | A1 | 11/2006 | Cossairt |
| 2007/0171521 | A1 | 7/2007 | Sugawara et al. |
| 2009/0009860 | A1 | 1/2009 | Marshall |
| 2009/0009871 | A1 | 1/2009 | Dunphy et al. |
| 2009/0109530 | A1 | 4/2009 | Michimori et al. |

(Continued)

FOREIGN PATENT DOCUMENTS

| GB | 2456170 A | 7/2009 |
| GB | 2496108 A | 5/2013 |

(Continued)

OTHER PUBLICATIONS

European Search Report, European pat. app. 20167389, dated Jul. 9, 2020.

(Continued)

*Primary Examiner* — Derek S. Chapel
(74) *Attorney, Agent, or Firm* — McDonnell Boehnen Hulbert & Berghoff LLP

(57) ABSTRACT

There is described herein a diffuser assembly comprising a leaf spring, diffuser and at least one actuator. The leaf spring is arranged as a rectangular frame having a width, x, and height, y. The diffuser is suspended by the frame such as within the frame. The at least one actuator arranged to move, such as translate, the diffuser. The assembly is arranged such that the leaf spring provides in-plane (x-y plane) stiffness, $k_x$ and $k_y$, less than the out-of-plane (z-direction) stiffness, $k_z$.

18 Claims, 7 Drawing Sheets

(56) References Cited

U.S. PATENT DOCUMENTS

| | | |
|---|---|---|
| 2010/0014134 A1 | 1/2010 | Cable |
| 2010/0020395 A1 | 1/2010 | Watanabe et al. |
| 2011/0002019 A1 | 1/2011 | Routley |
| 2012/0044553 A1 | 2/2012 | Kurashige |
| 2013/0265622 A1 | 10/2013 | Christmas |
| 2014/0253987 A1 | 9/2014 | Christmas |
| 2015/0022526 A1 | 1/2015 | Christmas |
| 2015/0085332 A1 | 3/2015 | Yoshida et al. |
| 2015/0116799 A1 | 4/2015 | Someno |
| 2015/0116800 A1 | 4/2015 | Yoshida et al. |
| 2016/0209669 A1 | 7/2016 | Digel |
| 2016/0381329 A1 | 12/2016 | Damberg |
| 2017/0082855 A1 | 3/2017 | Christmas |
| 2017/0115627 A1 | 4/2017 | Christmas |
| 2017/0212347 A1* | 7/2017 | Uragami ............ G02B 27/0149 |
| 2017/0220106 A1 | 8/2017 | Tomiyama et al. |
| 2017/0363869 A1 | 12/2017 | Christmas |
| 2018/0045958 A1 | 2/2018 | Kuzuhara |
| 2018/0046138 A1 | 2/2018 | Christmas |
| 2018/0120768 A1 | 5/2018 | Christmas |
| 2018/0188532 A1 | 7/2018 | Christmas |
| 2019/0041641 A1 | 2/2019 | Christmas |
| 2019/0041797 A1 | 2/2019 | Christmas et al. |
| 2019/0064738 A1 | 2/2019 | Cole |

FOREIGN PATENT DOCUMENTS

| | | |
|---|---|---|
| GB | 2526275 A | 11/2015 |
| GB | 2547929 A | 9/2017 |
| GB | 2554575 A | 4/2018 |
| GB | 2567408 A | 4/2019 |
| GB | 2567409 A | 4/2019 |
| GB | 2567410 A | 4/2019 |
| GB | 2569206 A | 6/2019 |
| GB | 2569208 A | 6/2019 |
| JP | 2009210751 A | 9/2009 |
| JP | 2016114768 A | 6/2016 |
| WO | 2015064496 A1 | 5/2015 |
| WO | 2015064497 A1 | 5/2015 |
| WO | 2018078366 A1 | 5/2018 |
| WO | 2018100394 A1 | 6/2018 |
| WO | 2018100397 A1 | 6/2018 |
| WO | 2018150889 A1 | 8/2018 |

OTHER PUBLICATIONS

Golan, Lior et al., "Speckle Elimination Using Shift-Averaging in High-Rate Holographic Projection," Optics Express, 17(3), 1330-39 (2009).

Copending U.S. Appl. No. 16/051,945, filed Aug. 1, 2018.

Combined Search and Examination Report, UK Patent Application No. 1905158.0, dated Jul. 7, 2020.

* cited by examiner

DIFFUSER ASSEMBLY

CROSS-REFERENCE TO RELATED APPLICATIONS

This application claims the benefit of priority of United Kingdom Patent Application no. 1905158.0, filed Apr. 11, 2019, which is hereby incorporated herein by reference in its entirety.

FIELD

The present disclosure relates to an assembly for a diffuser. More specifically, the present disclosure relates to a diffuser assembly and a method of moving a diffuser. Some embodiments relate to a holographic projector and a picture generating unit for a head-up display.

BACKGROUND AND INTRODUCTION

Light scattered from an object contains both amplitude and phase information. This amplitude and phase information can be captured on, for example, a photosensitive plate by well-known interference techniques to form a holographic recording, or "hologram", comprising interference fringes. The hologram may be reconstructed by illumination with suitable light to form a two-dimensional or three-dimensional holographic reconstruction, or replay image, representative of the original object.

Computer-generated holography may numerically simulate the interference process. A computer-generated hologram may be calculated by a technique based on a mathematical transformation such as a Fresnel or Fourier transform. These types of holograms may be referred to as Fresnel/Fourier transform holograms or simply Fresnel/Fourier holograms. A Fourier hologram may be considered a Fourier domain/plane representation of the object or a frequency domain/plane representation of the object. A computer-generated hologram may also be calculated by coherent ray tracing or a point cloud technique, for example.

A computer-generated hologram may be encoded on a spatial light modulator arranged to modulate the amplitude and/or phase of incident light. Light modulation may be achieved using electrically-addressable liquid crystals, optically-addressable liquid crystals or micro-mirrors, for example.

A spatial light modulator typically comprises a plurality of individually-addressable pixels which may also be referred to as cells or elements. The light modulation scheme may be binary, multilevel or continuous. Alternatively, the device may be continuous (i.e. is not comprised of pixels) and light modulation may therefore be continuous across the device. The spatial light modulator may be reflective meaning that modulated light is output in reflection. The spatial light modulator may equally be transmissive meaning that modulated light is output in transmission.

A holographic projector may be provided using the system described herein. Such projectors have found application in head-up displays, "HUD", and head-mounted displays, "HMD", including near-eye devices, for example.

A moving diffuser may be used to improve image quality in devices, such as picture generating units for HUD, which use coherent light, such as holographic projectors, to form images. The present disclosure describes an improved diffuser assembly which facilitates movement of the diffuser.

SUMMARY

Aspects of the present disclosure are defined in the appended independent claims.

Reference herein to in-plane means in the plane of the diffuser—more specifically, in the plane containing the diffuser. Reference herein to out-of-the plane means out of the plane of the diffuser—more specifically, out of the plane containing the diffuser. The diffuser is planar having a major axis (or width) in the x-direction and minor axis (or height) in the y-direction. The plane of the diffuser is therefore the x-y plane. The surface normal of the diffuser is in the z-direction. The z-direction may be the optical axis or the direction of incident light.

Reference is made herein to stiffness with respect to the resistance to movement of the diffuser in a particular direction. The leaf spring assembly described herein is elastic—that is, the assembly causes the diffuser to return to a mean state, or rest position, when all forces—such as those provided by the at least one actuator—are removed. In accordance with the embodiments described herein, the out-of-plane stiffness is relatively high to provide relatively high resistance to movement in this direction because in-plane movement is preferred particularly for imaging applications, such as holographic projection, using high coherence light such as laser light.

Reference is made herein to mechanical connections. These mechanical connections may be direct connections or indirect connections. A direct connection is a connection without an intermediary element. An indirect connection between a first component and second component is a connection via a third component in which the first component directly connects to the third component and the third component directly connects to the second component. In some embodiments, the diffuser is housed in a frame—which may be referred to as an inner frame—and mechanical connections between the diffuser and leaf spring are indirect connections via the inner frame. In these embodiments, the inner housing is the third component of the indirect connection between the diffuser (first component) and leaf spring (second component).

There is described herein a diffuser assembly comprising a diffuser and at least one actuator. The diffuser is supported by at least one leaf spring. It may also be said that the diffuser is suspended by the leaf spring/s. It may also be said that the diffuser is floating. The assembly is arranged to provide in-plane stiffness and out of plane stiffness. The out of plane stiffness is greater than the in-plane stiffness. The at least one actuator arranged to provide in-plane translation of the diffuser. The out-of-plane stiffness may be considered high—particularly compared to the in-plane stiffness.

The leaf spring provides a first stiffness in the plane of the diffuser and a second stiffness perpendicular to the plane of the diffuser. The second stiffness is greater than the first stiffness. The in-plane translation of the diffuser is provided without changing the orientation of the diffuser—e.g. without any spinning or rotation of the diffuser about the z-axis. The leaf spring is elongated such as a long, thin strip. The leaf spring is bent four times to form a rectangular frame having four corners. It is not essential that the rectangle is complete—that is, it is not essential that the two ends of the leaf spring strip connect. The rectangular frame may therefore include a gap between, or alternatively overlap, the two ends of the strip. The rectangular frame may comprise a plurality of gaps or breaks along its length. In some embodiments, each side of the rectangular frame includes a gap or break such that the rectangular frame is four separate corner pieces each having an L-shape.

There is described herein a diffuser assembly comprising a leaf spring, diffuser and at least one actuator. The leaf spring is arranged as a rectangular frame having a width and height. The diffuser is suspended by the frame such as within the frame. The at least one actuator arranged to move, such as translate, the diffuser. The assembly is arranged such that the leaf spring provides in-plane (x-y plane) stiffness, $k_x$ and $k_y$, less than the out-of-plane (z-direction) stiffness, $k_z$.

High stiffness in the z-direction resists movement in the z-direction such that any image (e.g. holographic reconstruction) formed on the diffuser surface remains in focus during movement of the diffuser. Relatively low stiffness in the x-y plane of the diffuser allows the diffuser to move in the x-y plane to reduce laser speckle in any image formed using laser light on the diffuser surface. The dynamics of the diffuser assembly is such that the motors substantially self-synchronize such that their vibrations can constructively interfere without the need for complex control methods. The system is arranged in such a way that it is substantially quiet. The assembly is desirable in a laser system to mitigate speckle but can also have applications in other HUD technologies to mitigate so-called grain artifacts.

Each side of the frame may have at least one pivot point about which it can flex in one direction. A pivot point is a point or region at which the leaf spring is held rigid (i.e. cannot move). The pivot points allow the leaf spring to flex in the x-direction and in the y-direction whilst providing mechanical fixing which preserves the orientation of the diffuser during movement.

The total length of leaf spring in the width direction that can flex or bend (about a pivot point) is equal to the total length of leaf spring in the height direction that can flex or bend (about a pivot point). It may be said that the total length of cantilever in x-direction is equal to the total length of cantilever in the y-direction (when the leaf spring is in the rest/undeflected state). Accordingly, the stiffness of the leaf spring structure is equal in the x and y directions which means that movement of the diffuser is symmetrical—e.g. circular rather than elliptical. Circular movement is preferable because it means the speed of the movement is constant—i.e. without acceleration of deceleration.

To get an equal x and y displacement (so that a circular path is scribed) the stiffness in the x-direction is the same as the stiffness in the y-direction. In embodiments, this is achieved by having a homogeneous spring section and equal lengths in the x-direction and y-direction from the pivot points. In other embodiments, different x and y lengths are used along with corresponding stiffness differences to provide the same displacement in x and y.

The diffuser assembly may further comprise a support structure arrange to support the leaf spring. Accordingly, the mean position of the assembly over time does not change. Mechanical connection between the support structure and leaf spring may form two of the pivot points.

Each pivot point may be formed by a mechanical connection between the leaf spring and diffuser or between the leaf spring and support structure. Equal and opposite mechanical connection between the leaf spring and diffuser may be provided on one pair of opposite sides of the leaf spring (e.g. top and bottom sides). Equal and opposite mechanical connection between the leaf spring and support structure may be provided on the other pair of opposite sides of the leaf spring (e.g. left and right sides). Even mounting improves the symmetry of the diffuser movement.

The mechanical connections are such that the orientation of the diffuser is substantially fixed. In embodiments, the diffuser has a different angle of diffusion in the x and y-directions. By preserving the orientation of the diffuser during movement, the benefits of having different angles of diffusion in the two orthogonal directions are preserved.

The pivot points may be equal and opposite. Each pivot point may have a corresponding pivot point on the opposite side of the leaf spring. The pivot point or pivot points may divide each side of the leaf spring into sections of equal length. Accordingly, equal stiffness in the x and y-directions is provided.

The leaf spring may be a thin strip of material having a smallest dimension. The out-of-plane direction may be perpendicular to the smallest dimension of the leaf spring. More specifically, the out-of-plane direction is perpendicular to the smallest dimension along the entire length of the leaf spring or at all points around the rectangular frame. This provides high stiffness in the z-direction.

The spring to which the diffuser is mounted is design in such a way that it has a relatively low stiffness in two orthogonal directions (x and y) parallel to the plane of the diffuser. There is a high degree of stiffness in the remaining orthogonal direction (z) perpendicular to the diffuser. In some embodiments, this is achieved with the described thin vs thick dimension. However, the required functionality may be achieved in other ways. For example, an 'I' beam is broadly a square section—however, it is much stiffer in one direction than the other.

The leaf spring may be made of spring steel and the shortest dimension of the leaf spring may be less than 0.5 mm such as less than 0.25 mm or less than 0.1 mm. Alternatively, the leaf spring may be made of plastic and the shortest dimension of the leaf spring may be less than 3 mm such as less than 2 mm or less than 1 mm.

The diffuser and leaf spring may be substantially planar. Accordingly, improved symmetry of movement and compactness are achieved.

The assembly may be such that the movement of the diffuser is substantially in-plane. Accordingly, energy is not wasted and defocusing of any image formed on the diffuser is avoided.

The in-plane movement of the diffuser is preferably a substantially circular movement such that the speed of the movement is constant. This is owing to the symmetry between the pivot points and the arrangement of the at least one actuator. The diffuser is being translated in a substantially circular orbit without rotation.

The at least one actuator may be a single actuator attached to the middle of the diffuser. Alternatively, the at least one actuator may be a first actuator attached to a side of the diffuser and a second actuator attached to another—e.g. opposite—side of the diffuser.

The at least one actuation may be a first actuator attached to a first side of the diffuser and a second actuator attached to another side of the diffuser such as an adjacent side of the diffuser. For example, this may be achieved when the actuators are electromagnetic actuations.

The at least one actuator may be a motor having a stator attached to the diffuser and a rotor attached to a spinning eccentric load. Alternatively, the at least one actuator may be a magnetic actuator which is quieter than a motor. Notably the eccentric spinning load provides equal x direction and y directions excitation force.

The diffuser may be mounted within an inner frame and the leaf spring, inner frame and support structure are integral such as molded plastic. The leaf spring, inner frame and support structure may be formed in one-step by injection molding. The inner frame, diffuser, spring, and support structure each have specific mechanical or optical functionality, but this does not limit them to being separate discrete physical parts.

There is also described herein a diffuser assembly comprising: a diffuser mounted within an inner frame; an outer frame arranged to receive the inner frame; and a leaf spring arranged to suspend the inner frame within the outer frame, wherein the leaf spring extends around the inner surface of the outer frame. The leaf spring may be a thin strip of flexible material such as spring steel or plastic. The leaf spring may be at least partially sandwiched between the inner frame and outer frame.

The diffuser assembly may have a low mass less than 32 g such as less than 16 g or less than 8 g or less than 4 g.

There may be provided a holographic projector comprising the diffuser assembly and/or a head-up display including the holographic projector.

The term "hologram" is used to refer to the recording which contains amplitude information or phase information, or some combination thereof, regarding the object. The term "holographic reconstruction" is used to refer to the optical reconstruction of the object which is formed by illuminating the hologram. The system disclosed herein is described as a "holographic projector" because the holographic reconstruction is a real image and spatially-separated from the hologram. The term "replay field" is used to refer to the 2D area within which the holographic reconstruction is formed and fully focused. If the hologram is displayed on a spatial light modulator comprising pixels, the replay field will be repeated in the form of a plurality diffracted orders wherein each diffracted order is a replica of the zeroth-order replay field. The zeroth-order replay field generally corresponds to the preferred or primary replay field because it is the brightest replay field. Unless explicitly stated otherwise, the term "replay field" should be taken as referring to the zeroth-order replay field. The term "replay plane" is used to refer to the plane in space containing all the replay fields. The terms "image", "replay image" and "image region" refer to areas of the replay field illuminated by light of the holographic reconstruction. In some embodiments, the "image" may comprise discrete spots which may be referred to as "image spots" or, for convenience only, "image pixels".

The terms "encoding", "writing" or "addressing" are used to describe the process of providing the plurality of pixels of the SLM with a respective plurality of control values which respectively determine the modulation level of each pixel. It may be said that the pixels of the SLM are configured to "display" a light modulation distribution in response to receiving the plurality of control values. Thus, the SLM may be said to "display" a hologram and the hologram may be considered an array of light modulation values or levels.

It has been found that a holographic reconstruction of acceptable quality can be formed from a "hologram" containing only phase information related to the Fourier transform of the original object. Such a holographic recording may be referred to as a phase-only hologram. Embodiments relate to a phase-only hologram but the present disclosure is equally applicable to amplitude-only holography.

The present disclosure is also equally applicable to forming a holographic reconstruction using amplitude and phase information related to the Fourier transform of the original object. In some embodiments, this is achieved by complex modulation using a so-called fully complex hologram which contains both amplitude and phase information related to the original object. Such a hologram may be referred to as a fully-complex hologram because the value (grey level) assigned to each pixel of the hologram has an amplitude and phase component. The value (grey level) assigned to each pixel may be represented as a complex number having both amplitude and phase components. In some embodiments, a fully-complex computer-generated hologram is calculated.

Reference may be made to the phase value, phase component, phase information or, simply, phase of pixels of the computer-generated hologram or the spatial light modulator as shorthand for "phase-delay". That is, any phase value described is, in fact, a number (e.g. in the range 0 to $2\pi$) which represents the amount of phase retardation provided by that pixel. For example, a pixel of the spatial light modulator described as having a phase value of $\pi/2$ will retard the phase of received light by $\pi/2$ radians. In some embodiments, each pixel of the spatial light modulator is operable in one of a plurality of possible modulation values (e.g. phase delay values). The term "grey level" may be used to refer to the plurality of available modulation levels. For example, the term "grey level" may be used for convenience to refer to the plurality of available phase levels in a phase-only modulator even though different phase levels do not provide different shades of grey. The term "grey level" may also be used for convenience to refer to the plurality of available complex modulation levels in a complex modulator.

The hologram therefore comprises an array of grey levels—that is, an array of light modulation values such as an array of phase-delay values or complex modulation values. The hologram is also considered a diffractive pattern because it is a pattern that causes diffraction when displayed on a spatial light modulator and illuminated with light having a wavelength comparable to, generally less than, the pixel pitch of the spatial light modulator.

Reference is made herein to combining the hologram with other diffractive patterns such as diffractive patterns functioning as a lens or grating. For example, a diffractive pattern functioning as a grating may be combined with a hologram to translate the replay field on the replay plane or a diffractive pattern functioning as a lens may be combined with a hologram to focus the holographic reconstruction on a replay plane in the near field.

Although different embodiments and groups of embodiments may be disclosed separately in the detailed description which follows, any feature of any embodiment or group of embodiments may be combined with any other feature or combination of features of any embodiment or group of embodiments. That is, all possible combinations and permutations of features disclosed in the present disclosure are envisaged.

BRIEF DESCRIPTION OF THE DRAWINGS

Specific embodiments are described by way of example only with reference to the following figures.

DETAILED DESCRIPTION OF EMBODIMENTS

The present invention is not restricted to the embodiments described in the following but extends to the full scope of the appended claims. That is, the present invention may be embodied in different forms and should not be construed as limited to the described embodiments, which are set out for the purpose of illustration.

Terms of a singular form may include plural forms unless specified otherwise.

A structure described as being formed at an upper portion/lower portion of another structure or on/under the other structure should be construed as including a case where the structures contact each other and, moreover, a case where a third structure is disposed there between.

In describing a time relationship—for example, when the temporal order of events is described as "after", "subsequent", "next", "before" or suchlike—the present disclosure should be taken to include continuous and non-continuous events unless otherwise specified. For example, the description should be taken to include a case which is not continuous unless wording such as "just", "immediate" or "direct" is used.

Although the terms "first", "second", etc. may be used herein to describe various elements, these elements are not to be limited by these terms. These terms are only used to distinguish one element from another. For example, a first element could be termed a second element, and, similarly, a second element could be termed a first element, without departing from the scope of the appended claims.

Features of different embodiments may be partially or overall coupled to or combined with each other, and may be variously inter-operated with each other. Some embodiments may be carried out independently from each other, or may be carried out together in co-dependent relationship.

Optical Configuration

Figure 1:
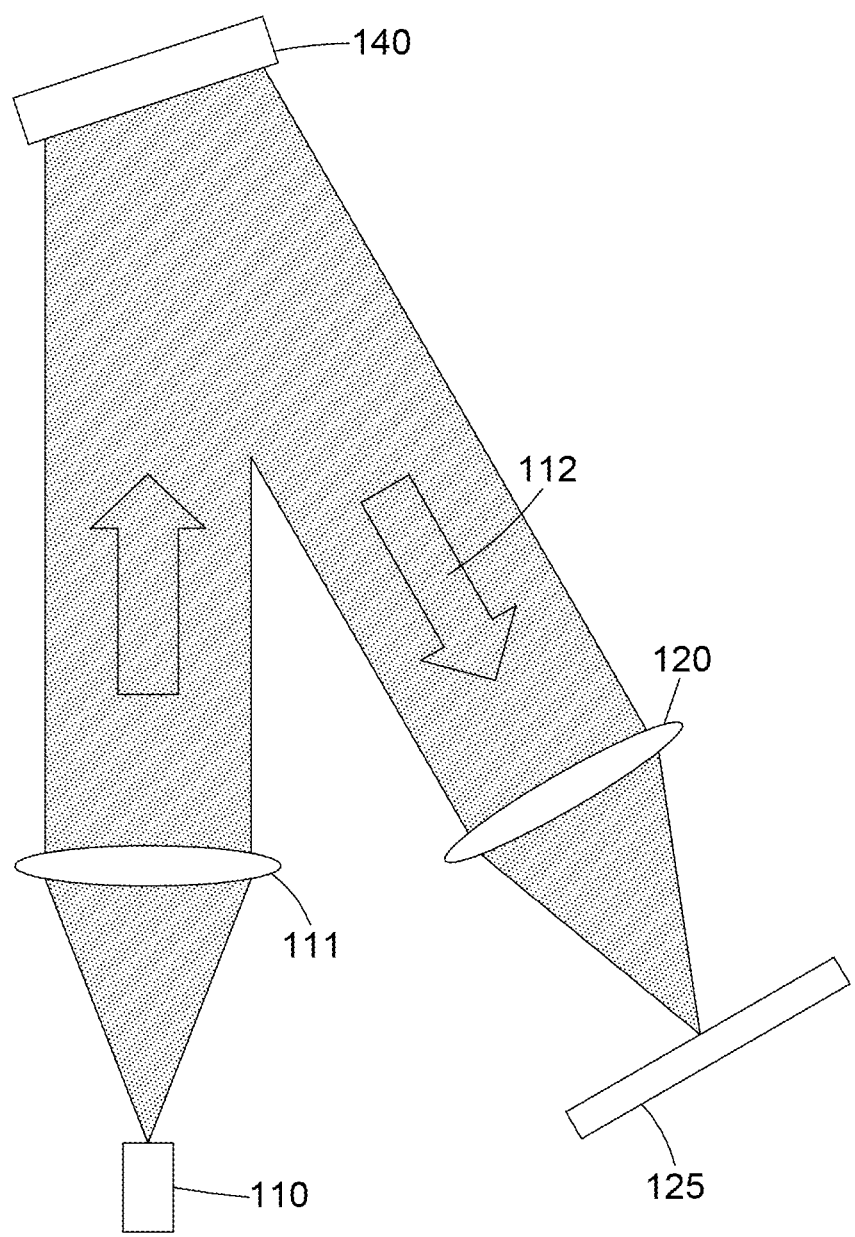
FIG. 1 is a schematic showing a reflective SLM producing a holographic reconstruction on a screen.

FIG. 1 shows an embodiment in which a computer-generated hologram is encoded on a single spatial light modulator. The computer-generated hologram is a Fourier transform of the object for reconstruction. It may therefore be said that the hologram is a Fourier domain or frequency domain or spectral domain representation of the object. In this embodiment, the spatial light modulator is a reflective liquid crystal on silicon, "LCOS", device. The hologram is encoded on the spatial light modulator and a holographic reconstruction is formed at a replay field, for example, a light receiving surface such as a screen or diffuser.

A light source 110, for example a laser or laser diode, is disposed to illuminate the SLM 140 via a collimating lens 111. The collimating lens causes a generally planar wavefront of light to be incident on the SLM. In FIG. 1, the direction of the wavefront is off-normal (e.g. two or three degrees away from being truly orthogonal to the plane of the transparent layer). However, in other embodiments, the generally planar wavefront is provided at normal incidence and a beam splitter arrangement is used to separate the input and output optical paths. In the embodiment shown in FIG. 1, the arrangement is such that light from the light source is reflected off a mirrored rear surface of the SLM and interacts with a light-modulating layer to form an exit wavefront 112. The exit wavefront 112 is applied to optics including a Fourier transform lens 120, having its focus at a screen 125. More specifically, the Fourier transform lens 120 receives a beam of modulated light from the SLM 140 and performs a frequency-space transformation to produce a holographic reconstruction at the screen 125.

Notably, in this type of holography, each pixel of the hologram contributes to the whole reconstruction. There is not a one-to-one correlation between specific points (or image pixels) on the replay field and specific light-modulating elements (or hologram pixels). In other words, modulated light exiting the light-modulating layer is distributed across the replay field.

In these embodiments, the position of the holographic reconstruction in space is determined by the dioptric (focusing) power of the Fourier transform lens. In the embodiment shown in FIG. 1, the Fourier transform lens is a physical lens. That is, the Fourier transform lens is an optical Fourier transform lens and the Fourier transform is performed optically. Any lens can act as a Fourier transform lens but the performance of the lens will limit the accuracy of the Fourier transform it performs. The skilled person understands how to use a lens to perform an optical Fourier transform.

Hologram Calculation

In some embodiments, the computer-generated hologram is a Fourier transform hologram, or simply a Fourier hologram or Fourier-based hologram, in which an image is reconstructed in the far field by utilising the Fourier transforming properties of a positive lens. The Fourier hologram is calculated by Fourier transforming the desired light field in the replay plane back to the lens plane. Computer-generated Fourier holograms may be calculated using Fourier transforms.

A Fourier transform hologram may be calculated using an algorithm such as the Gerchberg-Saxton algorithm. Furthermore, the Gerchberg-Saxton algorithm may be used to calculate a hologram in the Fourier domain (i.e. a Fourier transform hologram) from amplitude-only information in the spatial domain (such as a photograph). The phase information related to the object is effectively "retrieved" from the amplitude-only information in the spatial domain. In some embodiments, a computer-generated hologram is calculated from amplitude-only information using the Gerchberg-Saxton algorithm or a variation thereof.

The Gerchberg Saxton algorithm considers the situation when intensity cross-sections of a light beam, $I_A(x,y)$ and $I_B(x,y)$, in the planes A and B respectively, are known and $I_A(x,y)$ and $I_B(x,y)$ are related by a single Fourier transform. With the given intensity cross-sections, an approximation to the phase distribution in the planes A and B, $\psi_A(x,y)$ and $\psi_B(x,y)$ respectively, is found. The Gerchberg-Saxton algorithm finds solutions to this problem by following an iterative process. More specifically, the Gerchberg-Saxton algorithm iteratively applies spatial and spectral constraints while repeatedly transferring a data set (amplitude and phase), representative of $I_A(x,y)$ and $I_B(x,y)$, between the spatial domain and the Fourier (spectral or frequency) domain. The corresponding computer-generated hologram in the spectral domain is obtained through at least one iteration of the algorithm. The algorithm is convergent and arranged to produce a hologram representing an input image. The hologram may be an amplitude-only hologram, a phase-only hologram or a fully complex hologram.

In some embodiments, a phase-only hologram is calculated using an algorithm based on the Gerchberg-Saxton algorithm such as described in British patent 2,498,170 or 2,501,112 which are hereby incorporated in their entirety by reference. However, embodiments disclosed herein describe calculating a phase-only hologram by way of example only. In these embodiments, the Gerchberg-Saxton algorithm retrieves the phase information $\psi$ [u, v] of the Fourier transform of the data set which gives rise to a known amplitude information T[x, y], wherein the amplitude information T[x, y] is representative of a target image (e.g. a photograph). Since the magnitude and phase are intrinsically combined in the Fourier transform, the transformed magnitude and phase contain useful information about the accuracy of the calculated data set. Thus, the algorithm may be used iteratively with feedback on both the amplitude and the phase information. However, in these embodiments, only the phase information ψ[u, v] is used as the hologram to form a holographic representative of the target image at an image plane. The hologram is a data set (e.g. 2D array) of phase values.

In other embodiments, an algorithm based on the Gerchberg-Saxton algorithm is used to calculate a fully-complex hologram. A fully-complex hologram is a hologram having a magnitude component and a phase component. The hologram is a data set (e.g. 2D array) comprising an array of complex data values wherein each complex data value comprises a magnitude component and a phase component.

In some embodiments, the algorithm processes complex data and the Fourier transforms are complex Fourier transforms. Complex data may be considered as comprising (i) a real component and an imaginary component or (ii) a magnitude component and a phase component. In some embodiments, the two components of the complex data are processed differently at various stages of the algorithm.

Figure 2A:
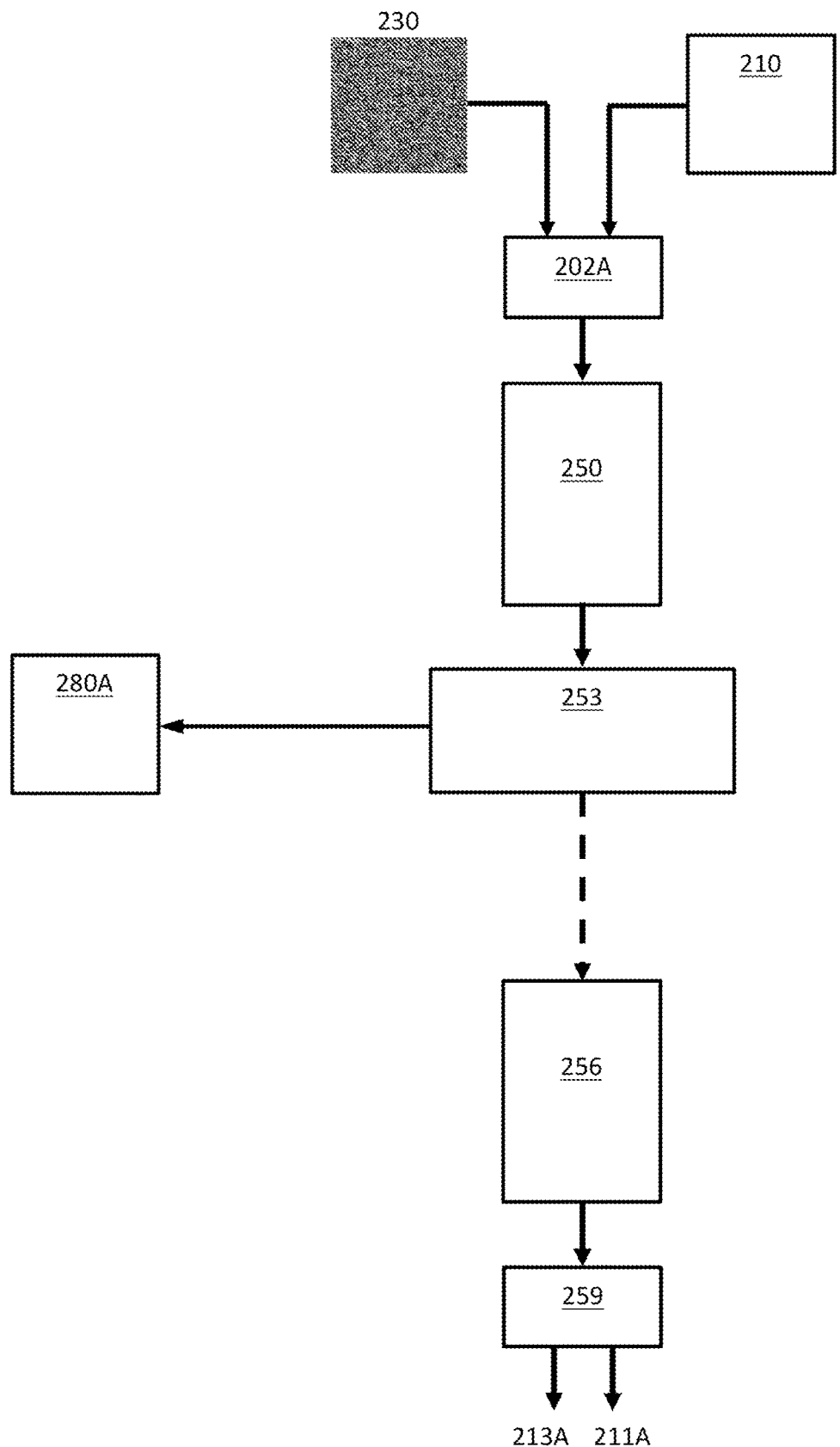
FIG. 2A illustrates a first iteration of an example Gerchberg-Saxton type algorithm.

FIG. 2A illustrates the first iteration of an algorithm in accordance with some embodiments for calculating a phase-only hologram. The input to the algorithm is an input image 210 comprising a 2D array of pixels or data values, wherein each pixel or data value is a magnitude, or amplitude, value. That is, each pixel or data value of the input image 210 does not have a phase component. The input image 210 may therefore be considered a magnitude-only or amplitude-only or intensity-only distribution. An example of such an input image 210 is a photograph or one frame of video comprising a temporal sequence of frames. The first iteration of the algorithm starts with a data forming step 202A comprising assigning a random phase value to each pixel of the input image, using a random phase distribution (or random phase seed) 230, to form a starting complex data set wherein each data element of the set comprising magnitude and phase. It may be said that the starting complex data set is representative of the input image in the spatial domain.

First processing block 250 receives the starting complex data set and performs a complex Fourier transform to form a Fourier transformed complex data set. Second processing block 253 receives the Fourier transformed complex data set and outputs a hologram 280A. In some embodiments, the hologram 280A is a phase-only hologram. In these embodiments, second processing block 253 quantises each phase value and sets each amplitude value to unity in order to form hologram 280A. Each phase value is quantised in accordance with the phase-levels which may be represented on the pixels of the spatial light modulator which will be used to "display" the phase-only hologram. For example, if each pixel of the spatial light modulator provides 256 different phase levels, each phase value of the hologram is quantised into one phase level of the 256 possible phase levels. Hologram 280A is a phase-only Fourier hologram which is representative of an input image. In other embodiments, the hologram 280A is a fully complex hologram comprising an array of complex data values (each including an amplitude component and a phase component) derived from the received Fourier transformed complex data set. In some embodiments, second processing block 253 constrains each complex data value to one of a plurality of allowable complex modulation levels to form hologram 280A. The step of constraining may include setting each complex data value to the nearest allowable complex modulation level in the complex plane. It may be said that hologram 280A is representative of the input image in the spectral or Fourier or frequency domain. In some embodiments, the algorithm stops at this point.

However, in other embodiments, the algorithm continues as represented by the dotted arrow in FIG. 2A. In other words, the steps which follow the dotted arrow in FIG. 2A are optional (i.e. not essential to all embodiments).

Third processing block 256 receives the modified complex data set from the second processing block 253 and performs an inverse Fourier transform to form an inverse Fourier transformed complex data set. It may be said that the inverse Fourier transformed complex data set is representative of the input image in the spatial domain.

Fourth processing block 259 receives the inverse Fourier transformed complex data set and extracts the distribution of magnitude values 211A and the distribution of phase values 213A. Optionally, the fourth processing block 259 assesses the distribution of magnitude values 211A. Specifically, the fourth processing block 259 may compare the distribution of magnitude values 211A of the inverse Fourier transformed complex data set with the input image 510 which is itself, of course, a distribution of magnitude values. If the difference between the distribution of magnitude values 211A and the input image 210 is sufficiently small, the fourth processing block 259 may determine that the hologram 280A is acceptable. That is, if the difference between the distribution of magnitude values 211A and the input image 210 is sufficiently small, the fourth processing block 259 may determine that the hologram 280A is a sufficiently-accurate representative of the input image 210. In some embodiments, the distribution of phase values 213A of the inverse Fourier transformed complex data set is ignored for the purpose of the comparison. It will be appreciated that any number of different methods for comparing the distribution of magnitude values 211A and the input image 210 may be employed and the present disclosure is not limited to any particular method. In some embodiments, a mean square difference is calculated and if the mean square difference is less than a threshold value, the hologram 280A is deemed acceptable. If the fourth processing block 259 determines that the hologram 280A is not acceptable, a further iteration of the algorithm may be performed. However, this comparison step is not essential and in other embodiments, the number of iterations of the algorithm performed is predetermined or preset or user-defined.

Figure 2B:
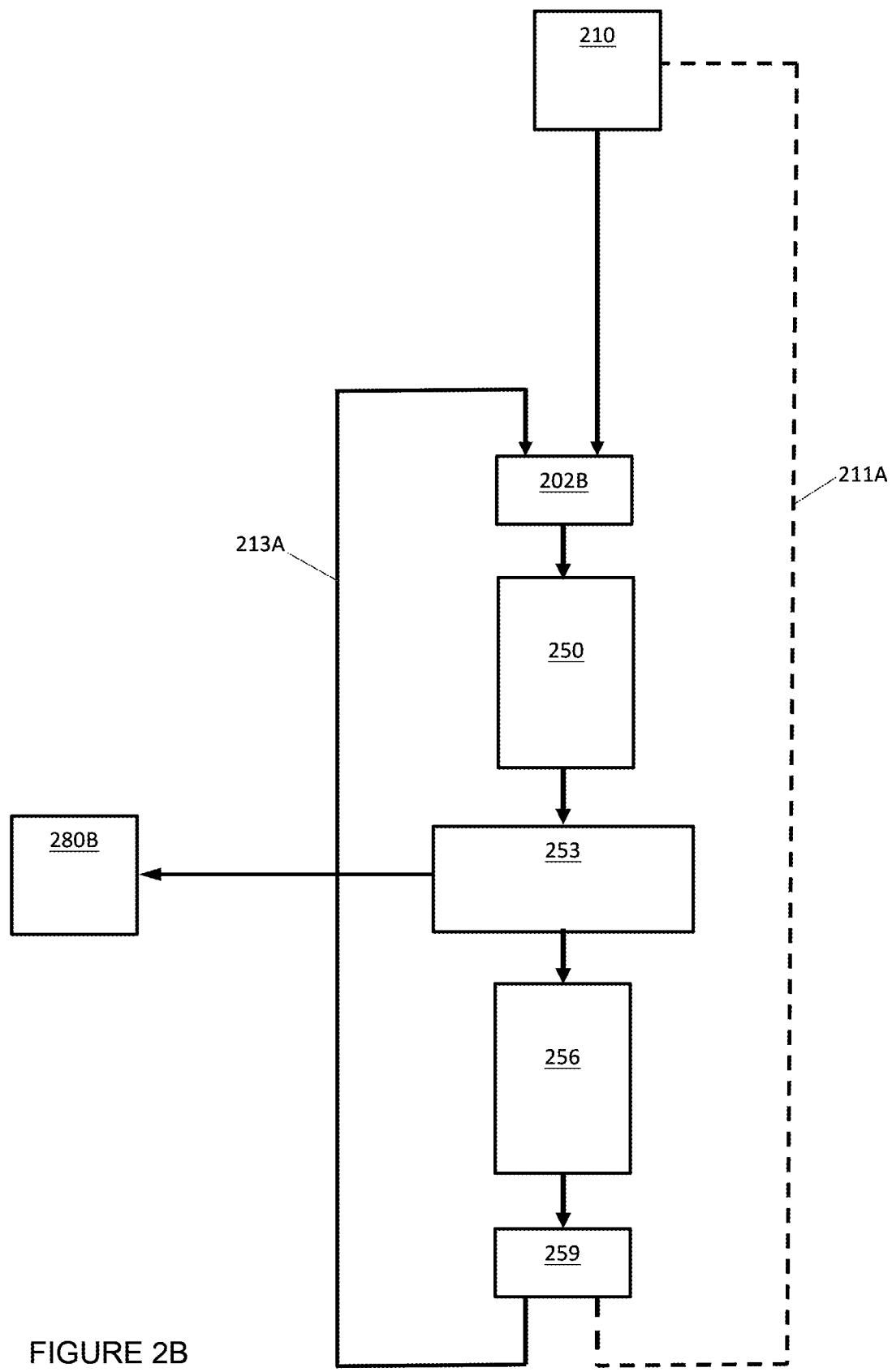
FIG. 2B illustrates the second and subsequent iterations of the example Gerchberg-Saxton type algorithm.

FIG. 2B represents a second iteration of the algorithm and any further iterations of the algorithm. The distribution of phase values 213A of the preceding iteration is fed-back through the processing blocks of the algorithm. The distribution of magnitude values 211A is rejected in favour of the distribution of magnitude values of the input image 210. In the first iteration, the data forming step 202A formed the first complex data set by combining distribution of magnitude values of the input image 210 with a random phase distribution 230. However, in the second and subsequent iterations, the data forming step 202B comprises forming a complex data set by combining (i) the distribution of phase values 213A from the previous iteration of the algorithm with (ii) the distribution of magnitude values of the input image 210.

The complex data set formed by the data forming step 202B of FIG. 2B is then processed in the same way described with reference to FIG. 2A to form second iteration hologram 280B. The explanation of the process is not therefore repeated here. The algorithm may stop when the second iteration hologram 280B has been calculated. However, any number of further iterations of the algorithm may be performed. It will be understood that the third processing block 256 is only required if the fourth processing block 259 is required or a further iteration is required. The output hologram 280B generally gets better with each iteration. However, in practice, a point is usually reached at which no measurable improvement is observed or the positive benefit of performing a further iteration is out-weighted by the negative effect of additional processing time. Hence, the algorithm is described as iterative and convergent.

Figure 2C:
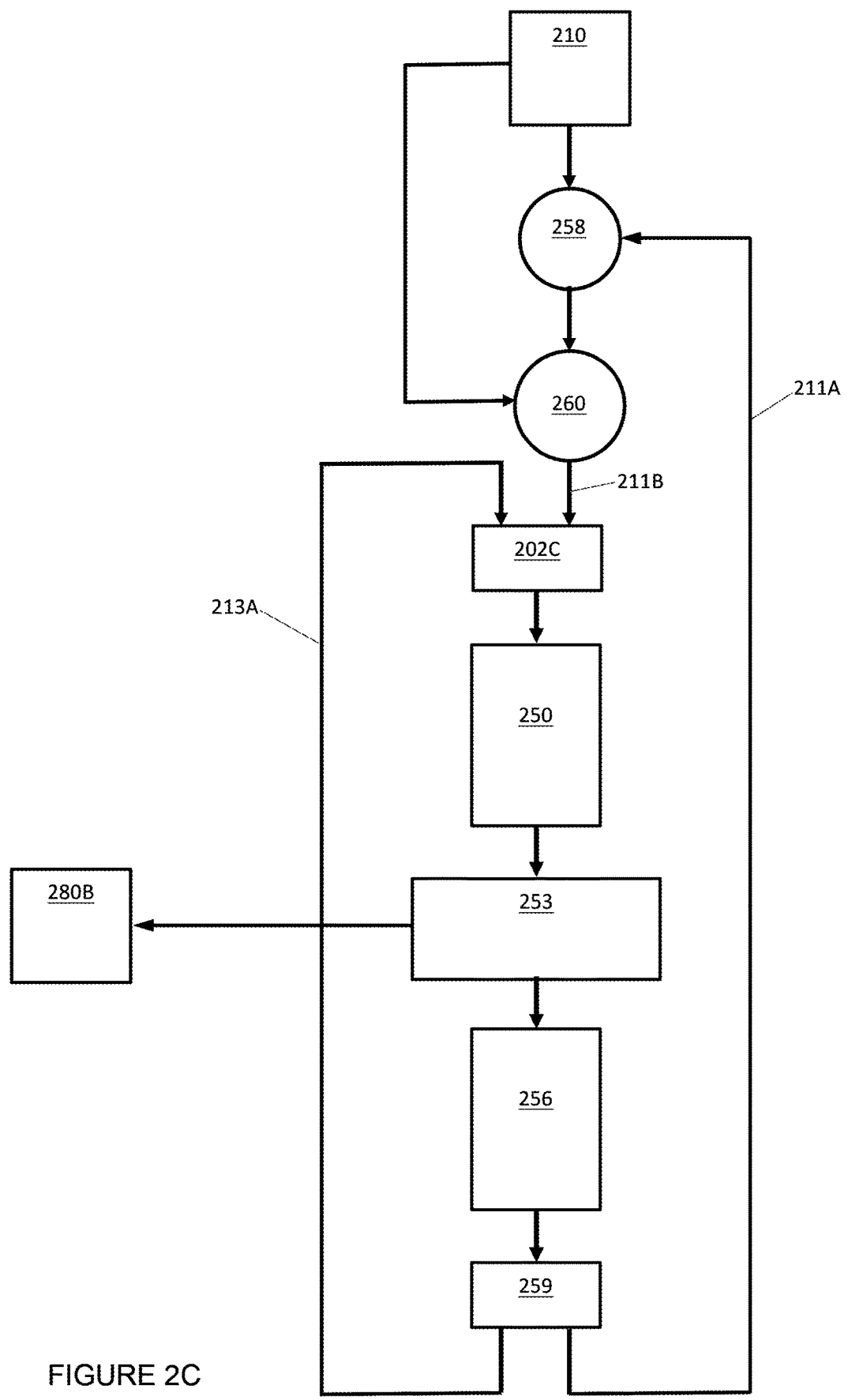
FIG. 2C illustrates alternative second and subsequent iterations of the example Gerchberg-Saxton type algorithm.

FIG. 2C represents an alternative embodiment of the second and subsequent iterations. The distribution of phase values 213A of the preceding iteration is fed-back through the processing blocks of the algorithm. The distribution of magnitude values 211A is rejected in favour of an alternative distribution of magnitude values. In this alternative embodiment, the alternative distribution of magnitude values is derived from the distribution of magnitude values 211 of the previous iteration. Specifically, processing block 258 subtracts the distribution of magnitude values of the input image 210 from the distribution of magnitude values 211 of the previous iteration, scales that difference by a gain factor α and subtracts the scaled difference from the input image 210. This is expressed mathematically by the following equations, wherein the subscript text and numbers indicate the iteration number:

$$R_{n+1}[x,y] = F'\{\exp(i\psi_n[u,v])\}$$

$$\psi_n[u,v] = \angle F\{\eta \cdot \exp(i\angle R_n[x,y])\}$$

$$\eta = T[x,y] - \alpha(|R_n[x,y]| - T[x,y])$$

where:
F' is the inverse Fourier transform;
F is the forward Fourier transform;
R[x,y] is the complex data set output by the third processing block 256;
T[x,y] is the input or target image;
∠ is the phase component;
ψ is the phase-only hologram 280B;
η is the new distribution of magnitude values 211B; and
α is the gain factor.

The gain factor α may be fixed or variable. In some embodiments, the gain factor α is determined based on the size and rate of the incoming target image data. In some embodiments, the gain factor α is dependent on the iteration number. In some embodiments, the gain factor α is solely function of the iteration number.

The embodiment of FIG. 2C is the same as that of FIG. 2A and FIG. 2B in all other respects. It may be said that the phase-only hologram ψ(u,v) comprises a phase distribution in the frequency or Fourier domain.

In some embodiments, the Fourier transform is performed using the spatial light modulator. Specifically, the hologram data is combined with second data providing optical power. That is, the data written to the spatial light modulation comprises hologram data representing the object and lens data representative of a lens. When displayed on a spatial light modulator and illuminated with light, the lens data emulates a physical lens—that is, it brings light to a focus in the same way as the corresponding physical optic. The lens data therefore provides optical, or focusing, power. In these embodiments, the physical Fourier transform lens 120 of FIG. 1 may be omitted. It is known how to calculate data representative of a lens. The data representative of a lens may be referred to as a software lens. For example, a phase-only lens may be formed by calculating the phase delay caused by each point of the lens owing to its refractive index and spatially-variant optical path length. For example, the optical path length at the centre of a convex lens is greater than the optical path length at the edges of the lens. An amplitude-only lens may be formed by a Fresnel zone plate. It is also known in the art of computer-generated holography how to combine data representative of a lens with a hologram so that a Fourier transform of the hologram can be performed without the need for a physical Fourier lens. In some embodiments, lensing data is combined with the hologram by simple addition such as simple vector addition. In some embodiments, a physical lens is used in conjunction with a software lens to perform the Fourier transform. Alternatively, in other embodiments, the Fourier transform lens is omitted altogether such that the holographic reconstruction takes place in the far-field. In further embodiments, the hologram may be combined in the same way with grating data—that is, data arranged to perform the function of a grating such as image steering. Again, it is known in the field how to calculate such data. For example, a phase-only grating may be formed by modelling the phase delay caused by each point on the surface of a blazed grating. An amplitude-only grating may be simply superimposed with an amplitude-only hologram to provide angular steering of the holographic reconstruction. The second data providing lensing and/or steering may be referred to as a light processing function or light processing pattern to distinguish from the hologram data which may be referred to as an image forming function or image forming pattern.

In some embodiments, the Fourier transform is performed jointly by a physical Fourier transform lens and a software lens. That is, some optical power which contributes to the Fourier transform is provided by a software lens and the rest of the optical power which contributes to the Fourier transform is provided by a physical optic or optics.

In some embodiments, there is provided a real-time engine arranged to receive image data and calculate holograms in real-time using the algorithm. In some embodiments, the image data is a video comprising a sequence of image frames. In other embodiments, the holograms are pre-calculated, stored in computer memory and recalled as needed for display on a SLM. That is, in some embodiments, there is provided a repository of predetermined holograms.

Embodiments relate to Fourier holography and Gerchberg-Saxton type algorithms by way of example only. The present disclosure is equally applicable to Fresnel holography and Fresnel holograms which may be calculated by a similar method. The present disclosure is also applicable to holograms calculated by other techniques such as those based on point cloud methods.

A holographic projector is described by way of example only of a type of picture generating unit which benefits from the diffuser assembly of the present disclosure. For the avoidance of doubt, the diffuser assembly of this disclosure may be used with any display device which forms an image on a diffuse screen using coherent light.

Light Modulation

A spatial light modulator may be used to display the diffractive pattern including the computer-generated hologram. If the hologram is a phase-only hologram, a spatial light modulator which modulates phase is required. If the hologram is a fully-complex hologram, a spatial light modulator which modulates phase and amplitude may be used or a first spatial light modulator which modulates phase and a second spatial light modulator which modulates amplitude may be used.

In some embodiments, the light-modulating elements (i.e. the pixels) of the spatial light modulator are cells containing liquid crystal. That is, in some embodiments, the spatial light modulator is a liquid crystal device in which the optically-active component is the liquid crystal. Each liquid crystal cell is configured to selectively-provide a plurality of light modulation levels. That is, each liquid crystal cell is configured at any one time to operate at one light modulation level selected from a plurality of possible light modulation levels. Each liquid crystal cell is dynamically-reconfigurable to a different light modulation level from the plurality of light modulation levels. In some embodiments, the spatial light modulator is a reflective liquid crystal on silicon (LCOS) spatial light modulator but the present disclosure is not restricted to this type of spatial light modulator.

A LCOS device provides a dense array of light modulating elements, or pixels, within a small aperture (e.g. a few centimetres in width). The pixels are typically approximately 10 microns or less which results in a diffraction angle of a few degrees meaning that the optical system can be compact. It is easier to adequately illuminate the small aperture of a LCOS SLM than it is the larger aperture of other liquid crystal devices. An LCOS device is typically reflective which means that the circuitry which drives the pixels of a LCOS SLM can be buried under the reflective surface. The results in a higher aperture ratio. In other words, the pixels are closely packed meaning there is very little dead space between the pixels. This is advantageous because it reduces the optical noise in the replay field. A LCOS SLM uses a silicon backplane which has the advantage that the pixels are optically flat. This is particularly important for a phase modulating device.

Figure 3:
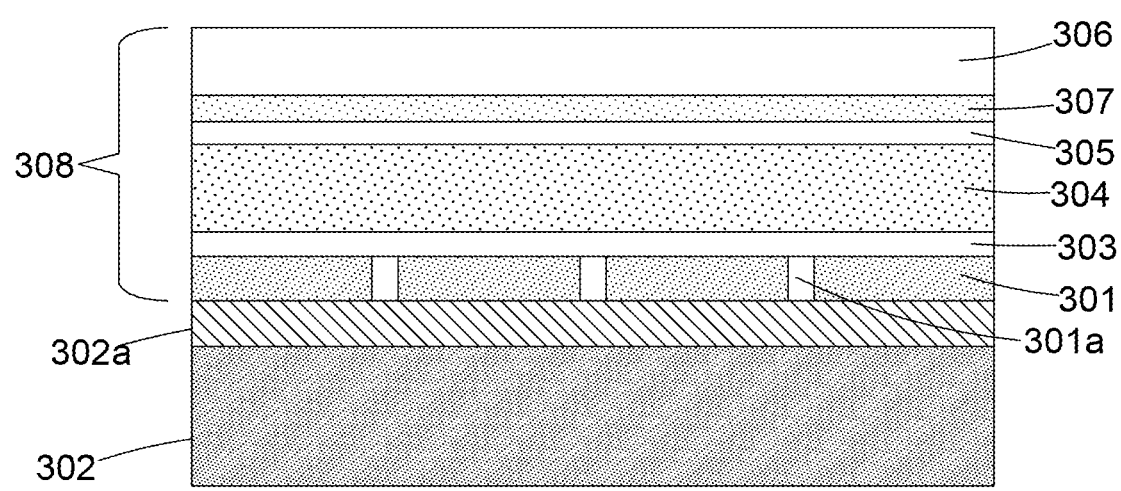
FIG. 3 is a schematic of a reflective LCOS SLM.

A suitable LCOS SLM is described below, by way of example only, with reference to FIG. 3. An LCOS device is formed using a single crystal silicon substrate 302. It has a 2D array of square planar aluminium electrodes 301, spaced apart by a gap 301a, arranged on the upper surface of the substrate. Each of the electrodes 301 can be addressed via circuitry 302a buried in the substrate 302. Each of the electrodes forms a respective planar mirror. An alignment layer 303 is disposed on the array of electrodes, and a liquid crystal layer 304 is disposed on the alignment layer 303. A second alignment layer 305 is disposed on the planar transparent layer 306, e.g. of glass. A single transparent electrode 307 e.g. of ITO is disposed between the transparent layer 306 and the second alignment layer 305.

Each of the square electrodes 301 defines, together with the overlying region of the transparent electrode 307 and the intervening liquid crystal material, a controllable phase-modulating element 308, often referred to as a pixel. The effective pixel area, or fill factor, is the percentage of the total pixel which is optically active, taking into account the space between pixels 301a. By control of the voltage applied to each electrode 301 with respect to the transparent electrode 307, the properties of the liquid crystal material of the respective phase modulating element may be varied, thereby to provide a variable delay to light incident thereon. The effect is to provide phase-only modulation to the wavefront, i.e. no amplitude effect occurs.

The described LCOS SLM outputs spatially modulated light in reflection. Reflective LCOS SLMs have the advantage that the signal lines, gate lines and transistors are below the mirrored surface, which results in high fill factors (typically greater than 90%) and high resolutions. Another advantage of using a reflective LCOS spatial light modulator is that the liquid crystal layer can be half the thickness than would be necessary if a transmissive device were used. This greatly improves the switching speed of the liquid crystal (a key advantage for the projection of moving video images). However, the teachings of the present disclosure may equally be implemented using a transmissive LCOS SLM.

Leaf-Spring Assembly

A laser-based image forming system may use a diffuser but may suffer the adverse effects of speckle. This may be mitigated by moving the diffuser such that the speckle is no longer perceivable. Moving the diffuser to mitigate speckle without introducing other side effects is challenging. In some applications this is achieved by spinning the diffuser which has the advantage of mitigating speckle in a very simple manner without generating significant noise. However, a spinning diffuser may need to be large because the image is typically rectangular and the centre of rotation cannot be used for the image (either due to insufficient movement or the presences of a drive system). A spinning diffuser is also disadvantageous because it prohibits the use of a diffuser with different x-direction and y-direction diffusion angles (due to flicker) and so comprises optical efficiency.

In summary, there is disclosed herein a diffuser attached to a rectangular "leaf spring" which provides a simple, but very effective and robust, means to move the diffuser in an elliptical—or preferably circular—movement (X,Y) retaining whilst at the same time a high degree of out of plane stability.

Figure 4:
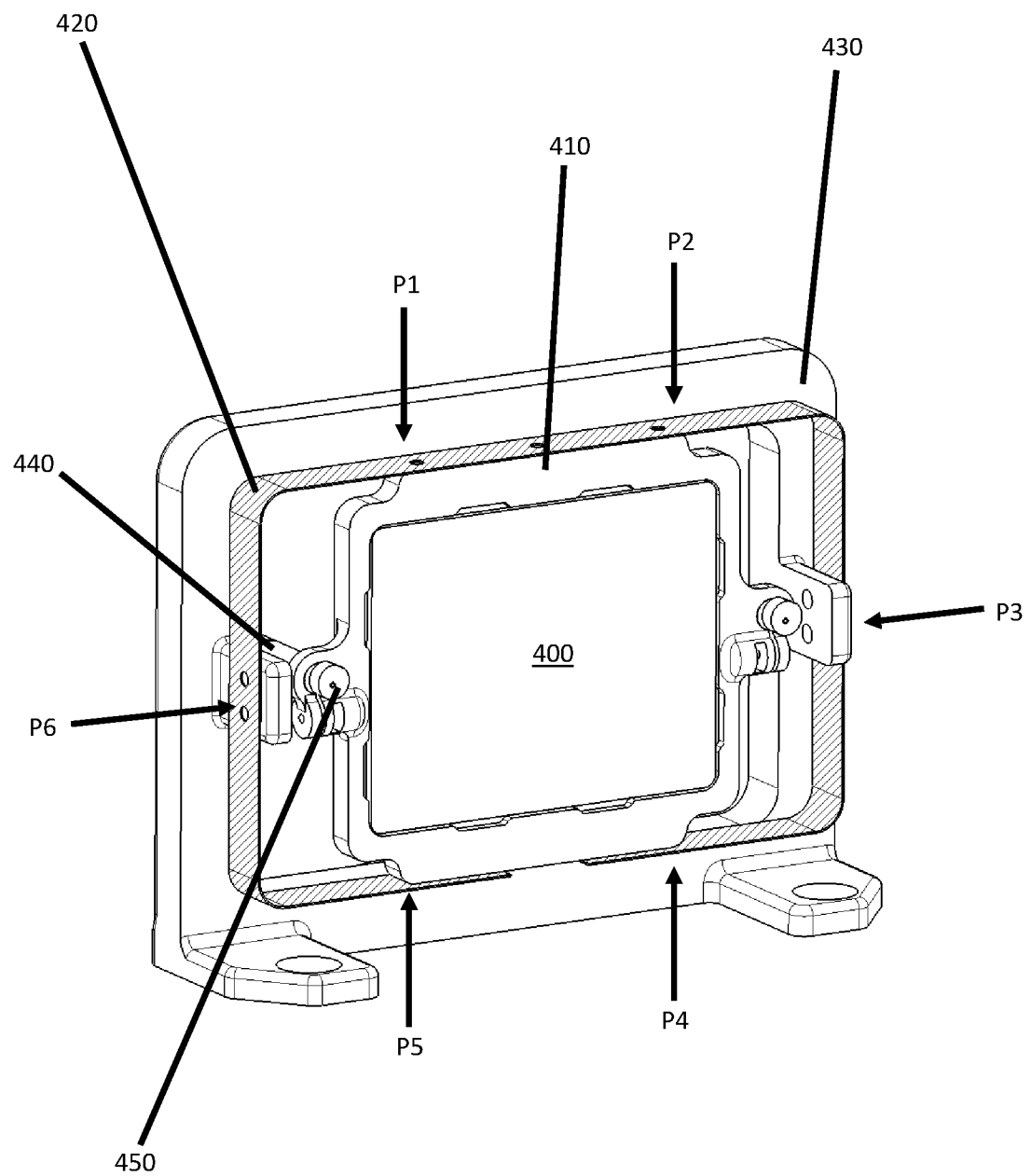
FIG. 4 shows a diffuser assembly in accordance with embodiments.

FIG. 4 shows an embodiment of the present disclosure. The key components are a diffuser 400, inner frame 410, leaf spring 420 (highlighted with hatching) and outer frame 430. The inner frame may be omitted. The outer frame 430 is an example of a support structure for the leaf spring 420. Other configurations of support structure may be used. The leaf spring 420 is shaped to form a rectangular frame. The leaf spring has a top side, a bottom side, a right side and a left side. The diffuser 400 is effectively suspended by the leaf spring 420. The top side and bottom side are connected to the inner frame 410. The right side and left side are connected to the outer frame 430. The leaf spring 420 is fixedly connected to either the inner frame 410 or outer frame 430 to form a plurality of fixing points which are referred to herein as pivot points because the leaf spring 420 may cantilever or bend about each pivot point. FIG. 4 shows six pivot points P1-P6 but any number of pivot points may be used providing the leaf spring 420 can equally cantilever in two orthogonal directions in the plane of the diffuser 400. The skilled reader will understand that whilst pivot points P3 and P6 are shown as single pivot points, they each better characterised as being two pivots points—one at each extremity.

Figure 5:
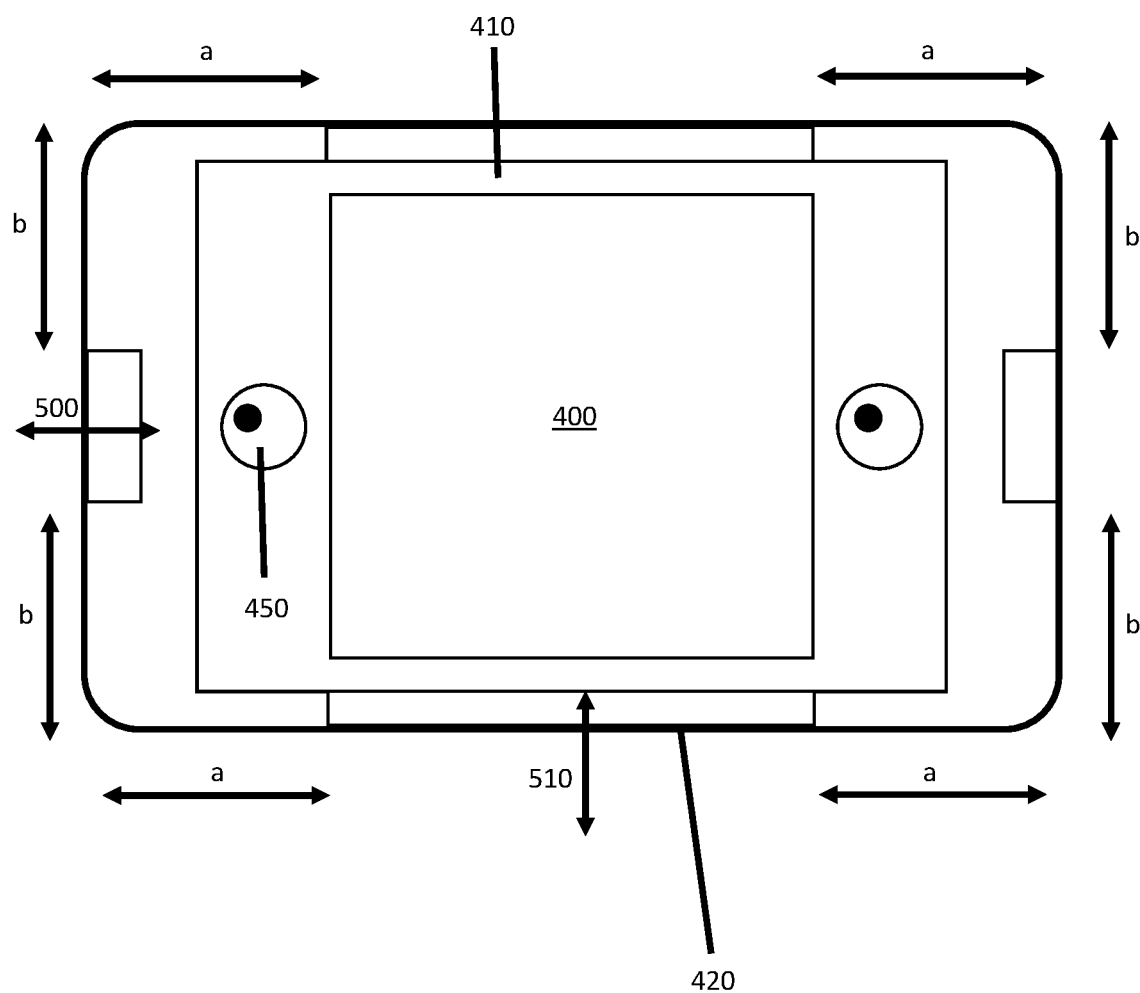
FIG. 5 a different view of the diffuser assembly in accordance with embodiments.

FIG. 5 shows a simplified view of the diffuser assembly. The position of the pivot points (i.e. the rigid connections to the leaf spring) are such that the cantilever distances a and b are equal around the diffuser. This symmetry provides equal displacement and therefore circular movement of the diffuser. Circular movement is advantageous because it maintains the speed of the movement—i.e. there is no deceleration or acceleration during oscillation. FIG. 5 shows two actuators symmetrically mounted to the sides of the diffuser. In this embodiment, each actuator is an electric motor having a stator 440 connected to the inner frame 410 via element 450 and rotor eccentrically attached to a load. Rotation of the eccentric load imparts a force on the stator which moves the inner frame 410 and therefore the diffuser 400. Owing to the symmetry of the assembly, the x and y-forces on the diffuser are equal and the diffuser oscillations in a circle trajectory. The assembly provides high stiffness in the z-direction which prevents the diffuser moving out of its plane. FIG. 5 shows the x-deflection 500 and y-deflection 510 of the leaf spring caused by spinning of the eccentrically-mounted load. FIG. 5 shows the symmetry provided by the cantilever distances a and b. In some embodiments, a=b.

In other embodiments, the actuators may used electromagnetics to impart an x and y-force on the diffuser. In other embodiments, only one actuator is used. The single actuator may, for example, be mounted to the middle of the diffuser. Notably, in other embodiments, the inner frame is omitted and the diffuser is directly connected to the other components as described. Notably, in other embodiments, the rectangular frame comprises four separate L-shaped elements each forming one corner of a general frame-type configuration. The leaf spring may be formed of any material having stiffness such as spring steel or plastic. In an example, the motor frequency is 25 Hz, the thickness of the spring steel leaf spring is 0.2 mm, a=b=30 mm and the measured x-displacement was 3.7 mm. In this example, minimal z-displacement was observed and excellent speckle mitigation was provided. The example assembly was found to be considerably quieter than other configurations which facilitate movement of the diffuser.

In accordance with the present disclosure, the diffuser size can be similar (i.e. substantially equal) to the image size which allows package improvement. In a multi-image system, differing diffuser materials, optimised for each image, can be used on the same moving frame which provides optical efficiency gains without package increase. Additionally, it allows the diffusers to be in different planes which has other benefits in a HUD, for example. As the diffuser frame "levitates", movement can be achieved with minimum noise levels (independently of the way it's actuated—mechanically or magnetically). Continuous movement though two dimensions (which is advantageous over other non-spinning solutions), providing stiffness along optical axis (z) whilst allowing movement across the image plane (x-y).

Additional Features

In some embodiments, the light source is a laser such as a laser diode. The diffuser may more generally be referred to as a screen or light realisation surface.

The methods and processes described herein may be embodied on a computer-readable medium. The term "computer-readable medium" includes a medium arranged to store data temporarily or permanently such as random-access memory (RAM), read-only memory (ROM), buffer memory, flash memory, and cache memory. The term "computer-readable medium" shall also be taken to include any medium, or combination of multiple media, that is capable of storing instructions for execution by a machine such that the instructions, when executed by one or more processors, cause the machine to perform any one or more of the methodologies described herein, in whole or in part.

The term "computer-readable medium" also encompasses cloud-based storage systems. The term "computer-readable medium" includes, but is not limited to, one or more tangible and non-transitory data repositories (e.g., data volumes) in the example form of a solid-state memory chip, an optical disc, a magnetic disc, or any suitable combination thereof. In some example embodiments, the instructions for execution may be communicated by a carrier medium. Examples of such a carrier medium include a transient medium (e.g., a propagating signal that communicates instructions).

It will be apparent to those skilled in the art that various modifications and variations can be made without departing from the scope of the appended claims. The present disclosure covers all modifications and variations within the scope of the appended claims and their equivalents.

The invention claimed is:

1. A diffuser assembly comprising:
 a leaf spring arranged as a rectangular frame having a width and height;
 a diffuser suspended within the frame; and
 a first actuator attached to a side of the diffuser and a second actuator attached to an opposite side of the diffuser, wherein the first and second actuators are arranged to move the diffuser such that the movement of the diffuser is substantially in-plane, wherein the assembly is arranged such that the leaf spring provides in-plane stiffness less than the out-of-plane stiffness, and wherein each of the first and second actuators is a motor having a stator attached to the diffuser and a rotor having a spinning eccentric load.

2. A diffuser assembly as claimed in claim 1 wherein each side of the frame has at least one pivot point about which it can flex in one direction.

3. A diffuser assembly as claimed in claim 1, wherein a total length of the leaf spring in the width direction that can flex about a pivot point is equal to a total length of the leaf spring in the height direction that can flex about a pivot point.

4. A diffuser assembly as claimed in claim 3 wherein each pivot point is formed by a mechanical connection between the leaf spring and diffuser or between the leaf spring and a support structure.

5. A diffuser assembly as claimed in claim 4 wherein the mechanical connections are such that the orientation of the diffuser is fixed.

6. A diffuser assembly as claimed in claim 3 wherein the pivot points are equal and opposite.

7. A diffuser assembly as claimed in claim 3 wherein each pivot point has a corresponding pivot point on the opposite side of the leaf spring.

8. A diffuser assembly as claimed in claim 3 wherein the pivot point or pivot points divide each side of the leaf spring into sections of equal length.

9. A diffuser assembly as claimed in claim 1 wherein the diffuser assembly further comprises a support structure arrange to support the leaf spring.

10. A diffuser assembly as claimed in claim 9, wherein the diffuser is mounted within an inner frame and the leaf spring, inner frame and support structure are integral.

11. A diffuser assembly as claimed in claim 1 wherein the leaf spring is a strip of material having a smallest dimension, wherein the out-of-plane direction is perpendicular to the smallest dimension of the leaf spring.

12. A diffuser assembly as claimed in claim 1 wherein the leaf spring is made of spring steel and the shortest dimension of the leaf spring is less than 0.5 mm.

13. A diffuser assembly as claimed in claim 1 wherein the leaf spring is made of plastic and the shortest dimension of the leaf spring is less than 3 mm.

14. A diffuser assembly as claimed in claim 1 wherein the diffuser and leaf spring are substantially planar.

15. A diffuser assembly as claimed in claim 1 wherein the in-plane movement of the diffuser is a substantially circular movement.

16. An optical system comprising
 a diffuser assembly according to claim 1; and a display system configured to display an image on the diffuser of the diffuser assembly.

17. An optical system according to claim 16, wherein the display system is a holographic projector.

18. A method of reducing speckle, the method comprising:
   providing a diffuser assembly according to claim 1;
   displaying an image on the diffuser of the diffuser assembly; and
   while displaying the image on the diffuser, moving the diffuser relative to the frame such that the diffuser moves substantially more in-plane than out-of-plane, thereby reducing speckle in the image.

* * * * *